(12) United States Patent
Omori

(10) Patent No.: US 8,944,686 B2
(45) Date of Patent: Feb. 3, 2015

(54) RADIAL FOIL BEARING

(71) Applicant: Naomichi Omori, Tokyo (JP)

(72) Inventor: Naomichi Omori, Tokyo (JP)

(73) Assignee: IHI Corporation (JP)

( * ) Notice: Subject to any disclaimer, the term of this patent is extended or adjusted under 35 U.S.C. 154(b) by 0 days.

(21) Appl. No.: 14/167,284

(22) Filed: Jan. 29, 2014

(65) Prior Publication Data

US 2014/0147063 A1    May 29, 2014

Related U.S. Application Data

(63) Continuation of application No. PCT/JP2012/068836, filed on Jul. 25, 2012.

(30) Foreign Application Priority Data

Aug. 1, 2011 (JP) .................. 2011-168574

(51) Int. Cl.
*F16C 32/06* (2006.01)
*F16C 17/02* (2006.01)

(52) U.S. Cl.
CPC .................. *F16C 17/024* (2013.01)
USPC ....................................... 384/103

(58) Field of Classification Search
CPC ....... F16C 17/024; F16C 17/028; F16C 27/02
USPC ......................... 384/103, 104, 105
See application file for complete search history.

(56) References Cited

U.S. PATENT DOCUMENTS 4,295,689 A * 10/1981 Licht ............................. 384/103
4,699,523 A * 10/1987 Hagemeister ............... 384/103

FOREIGN PATENT DOCUMENTS

| GB | 2069070 A | * | 8/1981 |
|----|-----------|---|--------|
| JP | 61-165011 |   | 7/1986 |
| JP | 63-166719 |   | 10/1988 |
| JP | 10-331846 |   | 12/1998 |
| JP | 2002-364643 |   | 12/2002 |
| JP | 2004-190762 |   | 7/2004 |
| JP | 2004-270904 |   | 9/2004 |
| JP | 2005163939 A | * | 6/2005 |
| JP | 2006-057652 |   | 3/2006 |
| JP | 2009-299748 |   | 12/2009 |
| JP | 2012-241775 |   | 12/2012 |
| JP | 2013-024344 |   | 2/2013 |

OTHER PUBLICATIONS

International Search Report and Written Opinion mailed Oct. 30, 2012 in corresponding PCT International Application No. PCT/JP2012/068836.

* cited by examiner

*Primary Examiner* — Phillip A Johnson
(74) *Attorney, Agent, or Firm* — Ostrolenk Faber LLP

(57) ABSTRACT

The present invention relates to a radial foil bearing for supporting a rotary shaft. The radial foil bearing includes a top foil, a back foil, and a bearing housing accommodating the top and back foils. The top foil is formed by winding a rectangular metal foil into a cylindrical shape so that one end of the metal foil is extended out in a tangential direction of a cylinder formed by the metal foil. An engagement groove is formed on an inner circumferential surface of the bearing housing in an axial direction of the bearing housing, and the engagement groove is formed so that a depth direction thereof corresponds to one tangential direction of the cylinder of the top foil. The one end of the top foil engages with the engagement groove.

12 Claims, 6 Drawing Sheets

RADIAL FOIL BEARING

This application is a Continuation application based on International Application No. PCT/JP2012/068836, filed Jul. 25, 2012, which claims priority on Japanese Patent Application No. 2011-168574, filed Aug. 1, 2011, the contents of both of which are incorporated herein by reference.

TECHNICAL FIELD

The present invention relates to a radial foil bearing.

BACKGROUND ART

In the related art, as a bearing for a high-speed rotating body, a radial bearing, which is used to be externally attached to a rotary shaft, is known. As the radial bearing, a radial foil bearing is well known, which includes a thin sheet-shaped top foil which forms a bearing surface, a back foil which elastically supports the top foil, and a cylindrical bearing housing which accommodates the top foil and the back foil. As the back foil of the radial foil bearing, a bump foil, in which a thin sheet is formed in a wave shape, is mainly used.

In general, in the radial foil bearing, in order to prevent the top foil or the bump foil from being detached from the bearing housing, one end (toe portion) of the top foil or the bump foil is directly fixed to the bearing housing or is indirectly fixed thereto via a spacer, using spot welding.

Moreover, in order to perform a mechanical fixation instead of the welding, a structure (for example, refer to Patent Document 1) is also known in which a portion or the entirety of one end of the top foil is bent and raised and the one end is engaged with an engagement groove formed on an outer ring (bearing housing).

DOCUMENT OF RELATED ART

Patent Document

[Patent Document 1] Japanese Unexamined Patent Application, First Publication No. 2004-190762

SUMMARY OF INVENTION

Technical Problem

However, if the top foil is welded, distortion occurs in the top foil due to heat input. Also in the structure of Patent Document 1, distortion occurs in the top foil due to the bending.

A thickness of a fluid lubricating film of a foil bearing, which is formed between the rotary shaft and the top foil due to rotation of the rotary shaft, is approximately 10 μm, which is significantly thin. Accordingly, if slight distortion occurs in the top foil, a loading capability or dynamic characteristics (rigidity and damping) of a bearing are influenced, and the designed performance cannot be obtained.

Moreover, in the top foil in which one end (toe portion) is fixed to the bearing housing using the spot welding, the vicinities of both ends (near the toe portion and near a free end) do not easily fit in a curved surface (are not easily deformed so as to be along the curved surface) which composes the inner circumferential surface of the bearing housing and become states close to planes. Accordingly, a force (local preload) clamping the rotary shaft occurs in the above portions close to planes. As a result, disadvantages are caused in that starting torque of the rotary shaft is increased, heat generation during operation is increased to be higher than or equal to a set value, and the like.

As a method which decreases the force (local preload) clamping the rotary shaft, for example, a method is considered which removes peaks of a bump foil (back foil) supporting the vicinities of both ends of the top foil. However, if the peaks of the bump foil are removed, supporting rigidity of the rotary shaft is significantly decreased at the position in which the peaks are removed. Accordingly, when the rotary shaft starts to move toward the above portion due to impact load or the like, it is not possible to suppress the movement of the rotary shaft. As a result, a rotary portion such as an impeller provided in the rotary shaft contacts a stationary portion (housing).

Moreover, as a method which prevents excessive decrease of the supporting rigidity of the rotary shaft at the above portion, a method which decreases the height of one peak of the bump foil at the above portion is considered. However, since an amount of the decreased height is on the order of a small unit such as several tens of micrometers, the manufacturing thereof is significantly difficult.

The present invention is made in consideration of the above-described circumstances, and provides a radial foil bearing which sufficiently decreases distortion generated in a top foil and can obtain the designed favorable performance with respect to the loading capability or dynamic characteristics (rigidity and damping) of the bearing. Moreover, the present invention provides a radial foil bearing which prevents occurrence of a force (local preload) clamping a rotary shaft.

Solution to Problem

According to a first aspect of the present invention, a radial foil bearing which supports a rotary shaft by being externally attached to the rotary shaft, including: a cylindrical top foil disposed so as to face the rotary shaft; a back foil disposed on a radially outer side of the top foil; and a cylindrical bearing housing accommodating the top foil and the back foil in an inside of the bearing housing, wherein the top foil is formed by winding a rectangular metal foil into a cylindrical shape so that one end of the metal foil is extended out in one tangential direction of a cylinder formed by the metal foil to an outside of the cylinder, wherein an engagement groove is formed on an inner circumferential surface of the bearing housing in an axial direction of the bearing housing, and the engagement groove is formed so that a depth direction thereof corresponds to the tangential direction of the cylinder of the top foil, and wherein the one end extending out in the tangential direction of the cylinder of the top foil engages with the engagement groove.

In this case, the one end of the top foil is formed so as to extend out in the tangential direction of the cylinder to the outside of the cylinder, and the one end engages with the engagement groove of the bearing housing. Accordingly, the top foil can be accommodated into and fixed to the bearing housing without performing spot welding or bending with respect to the top foil.

Moreover, the depth direction of the engagement groove corresponds to one tangential direction of the cylinder formed by the top foil. Accordingly, if the one end of the top foil is engaged with the engagement groove so as to correspond to the depth direction thereof, the top foil is not deformed in the engaged state. Therefore, distortion does not occur in the top foil. As a result, occurrence of distortion in the top foil is prevented, and the distortion of the top foil can be sufficiently decreased.

According to a second aspect of the present invention, in the radial foil bearing of the first aspect, a thin portion may be formed in each of the one end and the other end opposite to the one end in the top foil, wherein the thin portion is thinner than an intermediate portion between the one end and the other end.

In this case, both ends of the top foil are easily deformed elastically, and occurrence of a force (local preload) clamping the rotary shaft at both ends can be suppressed.

According to a third aspect of the present invention, in the radial foil bearing of the first aspect, the thin portion may be formed in a state where an outer circumferential surface of the thin portion is depressed further than an outer circumferential surface of the intermediate portion.

In this case, in the thin portion, a gap is formed between the thin portion and the back foil supporting an outer circumferential surface of the top foil, and occurrence of a force (local preload) clamping the rotary shaft can be securely prevented in the thin portion.

According to a fourth aspect of the present invention, in the radial foil bearing of any one of the first to the third aspects, the one end of the top foil engaging with the engagement groove may be fixed into the engagement groove by a fixing device.

In this case, by fixing the one end of the top foil into the engagement groove, it is possible to securely prevent the top foil from being rotated during the rotation of the rotary shaft and from being detached from the radial foil bearing.

According to a fifth aspect of the present invention, in the radial foil bearing of any one of the first to the fourth aspects, an intermediate foil may be disposed between a radially outer side of the top foil and a radially inner side of the back foil, and the bearing housing may accommodate the top foil, the intermediate foil, and the back foil in an inside of the bearing housing.

In this case, since the intermediate foil is provided between the top foil and the back foil, when shaft vibration occurs at the time of rotation of the rotary shaft, friction is generated due to mutual sliding between the top foil and the intermediate foil and between the intermediate foil and the back foil. Accordingly, effects damping the shaft vibration can be obtained. According to the damping effects, the shaft vibration of the rotary shaft can be suppressed. Moreover, rigidity of the top foil can be reinforced by the intermediate foil.

According to a sixth aspect of the present invention, in the radial foil bearing of the fifth aspect, intermediate foils may be stacked together.

In this case, in addition to the damping effects obtained by the friction which is generated due to the mutual sliding between the top foil and the intermediate foil and between the intermediate foil and the back foil, the damping effects obtained by the friction of the sliding between the intermediate foils can be added. As a result, the shaft vibration of the rotary shaft can be more easily suppressed.

Effects of Invention

According to a radial foil bearing of the present invention, occurrence of distortion in a top foil is prevented, and the distortion of the top foil can be sufficiently decreased. Moreover, shaft vibration of a rotary shaft can be easily suppressed. Accordingly, the desired favorable performance can be obtained with respect to the loading capability or dynamic characteristics (rigidity and damping) of the radial foil bearing.

DESCRIPTION OF EMBODIMENTS

Figure 1:
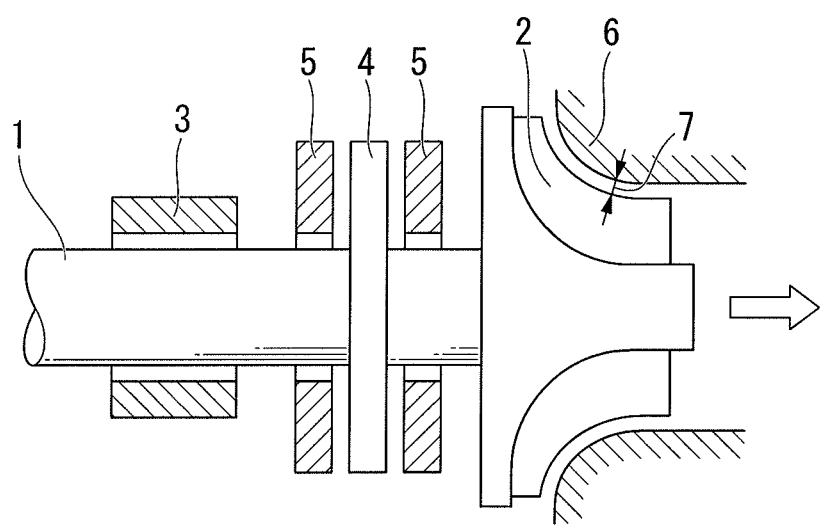
FIG. 1 is a schematic view showing an example of a turbo machine to which a radial foil bearing according to the present invention is applied.

Hereinafter, embodiments of a radial foil bearing of the present invention will be described in detail with reference to the drawings. Moreover, in order to show each member in a recognizable size in the drawings below, a scale of each member is appropriately changed.

First Embodiment

FIG. 1 is a side view showing an example of a turbo machine to which a radial foil bearing of the present invention is applied. In FIG. 1, a rotary shaft 1, an impeller 2 provided in the tip of the rotary shaft 1, and a radial foil bearing 3 are shown.

Moreover, in FIG. 1, only one radial foil bearing 3 is shown. However, in general, two radial foil bearings are provided in an axial direction of the rotary shaft 1, and thus, a support structure for the rotary shaft 1 is configured. Accordingly, also in the present embodiment, two radial foil bearings 3 are provided.

In the rotary shaft 1, a thrust collar 4 is fixed to a side on which the impeller 2 is formed. In each of both sides of the thrust collar 4, a thrust bearing 5 is disposed so as to face the thrust collar 4.

Moreover, the impeller 2 is disposed inside a housing 6 which is a stationary side, and a tip clearance 7 is provided between the housing 6 and the impeller 2.

In addition, the radial foil bearing 3 is externally attached to the rotary shaft 1 at a position nearer the center of the rotary shaft than the thrust collar 4.

Figure 2A:
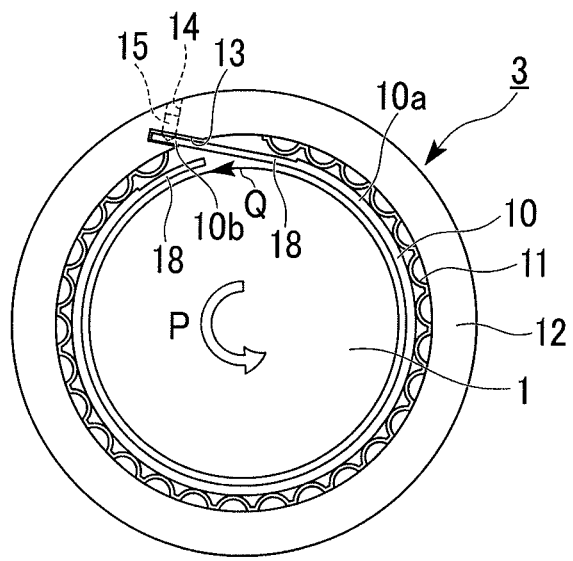
FIG. 2A is a view showing a schematic configuration of a first embodiment of a radial foil bearing according to the present invention, and is a side view of the radial foil bearing.

FIGS. 2A to 2E are views showing a first embodiment of the radial foil bearing which is applied to the turbo machine having the above-described configuration. As shown in FIG. 2A, the radial foil bearing 3 of the first embodiment has a cylindrical shape, is externally attached to the rotary shaft 1, and supports the rotary shaft 1. The radial foil bearing 3 includes a cylindrical top foil 10 which is disposed so as to face the rotary shaft 1, a back foil 11 which is disposed on the radially outer side of the top foil 10, and a bearing housing 12 which is disposed on the radially outer side of the back foil 11.

The bearing housing 12 is made of a metal, has a cylindrical shape, composes the outermost portion of the radial foil bearing 3, and accommodates the back foil 11 and the top foil 10 in the inside of the bearing housing. In the bearing housing 12, an engagement groove 13 is formed on the inner circumferential surface of the bearing housing 12 in the axial direction of the bearing housing 12.

Figure 2B:
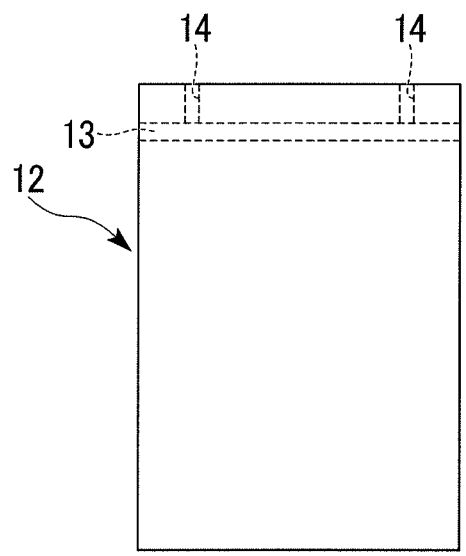
FIG. 2B is a view showing a schematic configuration of the first embodiment of the radial foil bearing according to the present invention, and is a front view of a bearing housing.

That is, as shown in FIG. 2B which is a front view of the bearing housing 12, the engagement groove 13 is formed over the entire length in the axial direction of the bearing housing 12 on the inner circumferential surface of the bearing housing 12. The engagement groove 13 is formed so that the depth direction thereof shown by an arrow A in FIG. 2C corresponds to a (one) tangential direction at a predetermined position of a cylinder portion 10a of the top foil 10 to be described below. In addition, the depth thereof is approximately 2 mm to 5 mm.

A pair of holes 14, which communicate with the engagement groove 13 and are orthogonal to the depth direction A of the engagement groove 13, are formed in a portion near the outer circumferential surface of the bearing housing 12. As described below, the pair of holes 14 are holes into which screws are inserted, and the screws are used to fix one end 10b of the top foil 10 into the engagement groove 13, wherein the one end 10b is inserted into the engagement groove 13. Female threaded portions are formed on the inner circumferential surfaces of the pair of holes 14.

As shown in FIG. 2A, the back foil 11 is formed of a foil (thin sheet) and elastically supports the top foil 10. As the back foil 11, for example, a bump foil, a spring foil which is described in Japanese Unexamined Patent Application, First Publication No. 2006-57652, Japanese Unexamined Patent Application, First Publication No. 2004-270904, or the like, a back foil which is described in Japanese Unexamined Patent Application, First Publication No. 2009-299748, or the like is used. In the present embodiment, the bump foil is used as the back foil 11. However, the spring foil or the back foil described above may be used as the back foil of the present invention.

As shown in FIG. 2A, in the bump foil (back foil) 11, a foil (thin sheet) is formed in a wave shape and is disposed so as to form a cylindrical shape along the inner circumferential surface of the bearing housing 12. In addition, in the present embodiment, the bump foil 11 is disposed in a state where both ends thereof are separated from each other with a predetermined gap. That is, the bump foil 11 is disposed so as not to cover the engagement groove 13 and the adjacent portion of the engagement groove 13 (the adjacent portion of the engagement groove 13 opposite to the depth direction A) on the inner circumferential surface of the bearing housing 12, and to cover only the surfaces except for the above portions.

Moreover, in the bump foil 11 which is formed in a wave shape, valley portions contacting the bearing housing 12 and peak portions contacting the top foil 10 are alternately formed in the circumferential direction of the radial foil bearing 3. Accordingly, the bump foil 11 elastically supports the top foil 10 through the peak portions contacting the top foil 10, particularly. Moreover, fluid passages are formed by peak portions and valley portions in the axial direction of the radial foil bearing 3.

Moreover, similar to the related art, the bump foil 11 is fixed to the bearing housing 12 using spot welding or the like.

The top foil 10 is wound in a cylindrical shape along the inner surface of the back foil (bump foil) 11, and is disposed so that the tip of the one end 10b of the top foil engages with the engagement groove 13 formed on the bearing housing 12. As shown in FIG. 2D which is a developed view of the top foil 10, a rectangular metal foil, in which a long side thereof is in a bearing circumferential direction and a short side thereof is in a bearing longitudinal direction, is rolled in a cylindrical shape in an arrow direction (the longitudinal direction of the long side: the bearing circumferential direction) of FIG. 2E which is a side view of the top foil, and thus, the top foil 10 is formed.

Figure 2C:
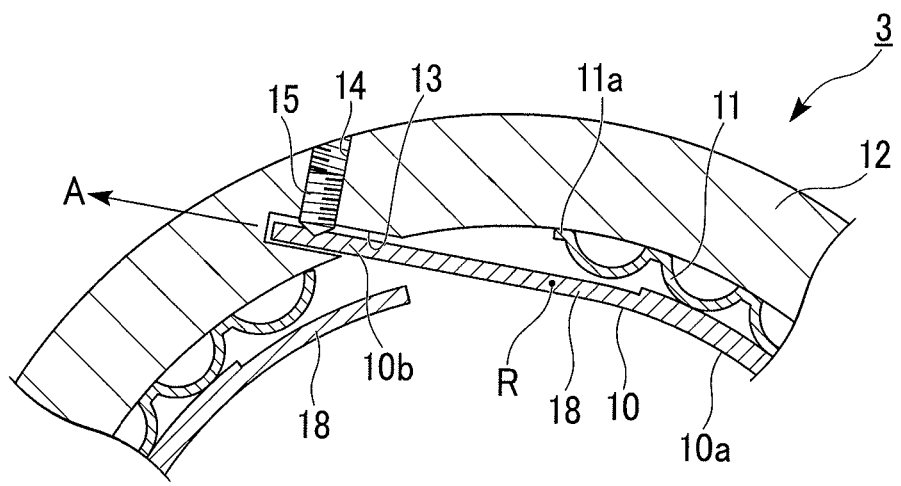
FIG. 2C is a view showing a schematic configuration of the first embodiment of the radial foil bearing according to the present invention, and is an enlarged side cross-sectional view of a main section of FIG. 2A.
Figure 2D:
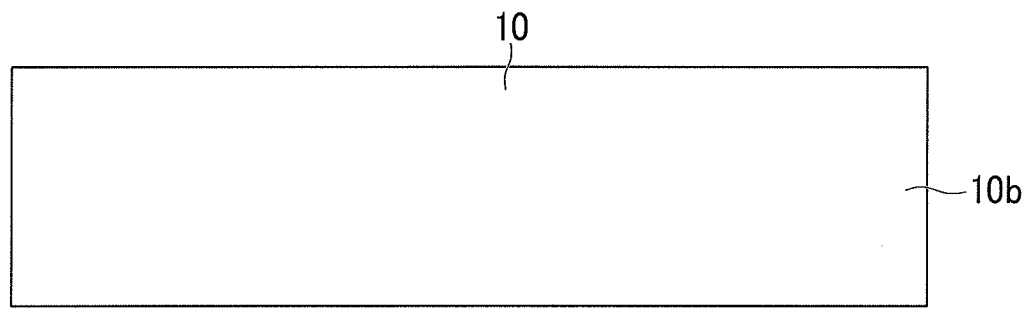
FIG. 2D is a view showing a schematic configuration of the first embodiment of the radial foil bearing according to the present invention, and is a developed view of a top foil.

However, the top foil 10 is not rolled so that both ends of the metal foil butt against each other, and as shown in FIG. 2C, is rolled so that the one end 10b overlaps with the outside of the other side. Moreover, the one end 10b is formed so as to extend out in the tangential direction at a predetermined position (a position R which overlaps with one end 11a of the back foil 11 in the present embodiment) of the cylinder portion 10a formed in the portion other than the overlapping portion.

The engagement groove 13 in the bearing housing 12 is also formed so that the depth direction A thereof corresponds to the tangential direction at the predetermined position (the position R) of the cylinder portion 10a of the top foil 10. Moreover, the expression "corresponding to the tangential direction" in the present embodiment means that the engagement groove 13 is formed so as to correspond to the tangential direction at the position R on the design. The engagement groove 13 may include a manufacturing error or a clearance in consideration of the manufacturing error. Accordingly, even when the tangential direction at the position R and the depth direction A of the engagement groove 13 are slightly deviated from each other, this case also is within the range of the present embodiment.

As described above, the top foil 10 is disposed so that the extending direction of the one end 10b corresponds to the depth direction A of the engagement groove 13. The tip of the one end 10b engages with the engagement groove 13. Accordingly, the top foil 10 is not deformed in the state where the one end 10b engages with the groove 13. Therefore, distortion does not occur in the top foil 10.

Moreover, in the present embodiment, the one end 10b of the top foil 10 which engages with the engagement groove 13 is fixed into the engagement groove 13 by a fixing device. Specifically, a male screw 15 as the fixing device is screwed and inserted into the hole 14. Accordingly, the one end 10b is fixed by being let to tightly contact the inner wall surface of the engagement groove 13. Moreover, the deformation of the one end 10b by being let to tightly contact the inner wall surface of the engagement groove 13 is slight. Therefore, the distortion of the top foil 10 due to the deformation of the one end 10b hardly occurs.

Figure 2E:
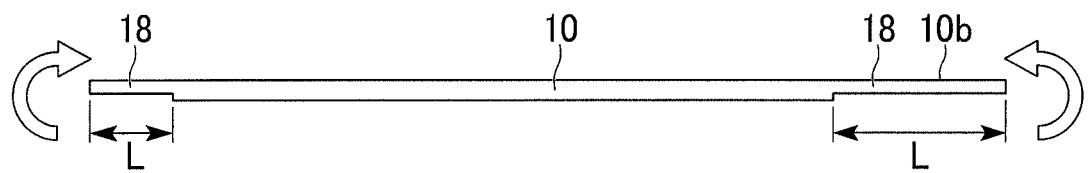
FIG. 2E is a view showing a schematic configuration of the first embodiment of the radial foil bearing according to the present invention, and is a developed side view of the top foil.

In addition, as shown in FIG. 2E, a thin portion 18 is formed in each of the one end 10b and the other end opposite to the one end, wherein the thin portion 18 is thinner than an intermediate portion between the one end 10b and the other end. As shown in FIGS. 2A and 2C, the thin portions 18 are formed to be thinned to be in a state where the outer circumferential surfaces thereof (surfaces near the bump foil 11) are depressed further than the outer circumferential surface of the intermediate portion.

The thin portions 18 are formed through processing (for example, etching processing) in which both ends of the top foil 10 are formed in a desired thickness (thinness) while being controlled by the ten micrometers. Specifically, when a bearing diameter is set at 35 mm, if the thickness of the top foil 10 is set at 100 μm, the thin portions 18 are formed so that the thickness thereof is approximately 80 μm. In addition, compared to bending or the like, in the etching processing, stress occurring in the top foil 10 is significantly small. Accordingly, the distortion hardly occurs in the top foil 10.

Moreover, as shown in FIGS. 2A, 2C, and 2E, a length L in the circumferential direction of the thin portion 18 is a length corresponding to a distance from the engagement groove 13 to one peak of the end of the bump foil 11 which is positioned in each of both sides of the engagement groove 13.

By forming the thin portions 18 on both ends of the top foil 10, both ends (thin portions 18) are easily deformed elastically. Therefore, both ends thereof become curved surfaces along the curved surfaces composing the inner circumferential surface of the bearing housing 12. Accordingly, a force (local preload) clamping the rotary shaft 1 hardly occurs also at both ends of the top foil 10.

In addition, the thin portions 18 are formed to be thinned to be in the state where the outer circumferential surfaces of both ends of the top foil 10 are depressed further than the outer circumferential surface of the intermediate portion. Accordingly, between the outer circumferential surface of the thin portion 18 and the back foil 11 supporting the outer circumferential surface of the top foil 10, a gap is formed between the thin portion 18 and the one peak of the end of the back foil. Accordingly, in the thin portions 18, the occurrence of the force (local preload) clamping the rotary shaft 1 can be securely prevented. In addition, instead of the example shown in FIGS. 2A and 2C, the length L in the circumferential direction of the thin portion 18 may be a length corresponding to a distance from the engagement groove 13 to approximately three peaks of the end of the bump foil 11.

Next, operations of the radial foil bearing 3 having the above-described configuration will be described.

In a state where the rotary shaft 1 stops, the top foil 10 is pressed onto the rotary shaft 1 by the back foil 11 and thus closely contacts the rotary shaft 1.

Moreover, in the present embodiment, both ends of the top foil 10 are the thin portions 18. Accordingly, the force (local preload) clamping the rotary shaft 1 hardly occurs in the thin portions 18.

If the rotary shaft 1 starts rotating in an arrow P direction of FIG. 2A, at first, the rotary shaft 1 is rotated at a low speed, and thereafter, is gradually accelerated and rotated at a high speed. Subsequently, as shown by an arrow Q in FIG. 2A, an ambient fluid is led from a space between the other end (the opposite end (free end) to the one end 10b) of the top foil 10 and one end of the bump foil 11, and the ambient fluid flows into a space between the top foil 10 and the rotary shaft 1. Accordingly, a fluid lubricating film is formed between the top foil 10 and the rotary shaft 1.

At this time, in a transient state until the fluid lubricating film is formed, solid friction is generated between the rotary shaft 1 and the top foil 10, and the solid friction becomes resistance at the time of starting. However, as described above, since the preload does not occur at both ends of the top foil 10 and since the top foil 10 of the side into which the ambient fluid flows is the flexible thin portion 18, an opening is easily formed between the top foil 10 and the rotary shaft 1. Accordingly, if the rotary shaft 1 starts, the fluid lubricating film is formed early, and the rotary shaft 1 is rotated in a non-contact state with respect to the top foil 10.

In the radial foil bearing 3, the one end 10b of the top foil 10 is formed so as to extend out in the tangential direction of the cylinder portion 10a, to the outside of the cylinder portion. The one end 10b engages with the engagement groove 13 of the bearing housing 12. Therefore, the top foil 10 can be accommodated into and fixed to the bearing housing 12 without performing spot welding or bending with respect to the top foil. In addition, the depth direction A of the engagement groove 13 corresponds to one tangential direction of the cylinder portion 10a which is formed by the top foil 10. Accordingly, if the one end 10b of the top foil 10 is engaged with the engagement groove 13 so as to correspond to the depth direction A thereof, the top foil 10 is not deformed in the engaged state. Therefore, distortion does not occur in the top foil 10. Occurrence of the distortion in the top foil 10 is prevented, and the distortion of the top foil 10 can be sufficiently decreased. As a result, the designed favorable performance can be exerted with respect to the loading capability or dynamic characteristics (rigidity and damping) of the bearing.

In addition, since the spot welding or bending causing distortion in the related art can be omitted with respect to the top foil 10, difficulty of the manufacturing is decreased, and the manufacturing cost can be decreased.

Moreover, since there is no welding of the top foil 10 to the bearing housing 12, errors of assembly or variation in assembly due to welding defects or the like are prevented. Accordingly, reproducibility of a non-defective product in a manufacturing process can be increased, and thus, improved mass productivity can be obtained.

The thin portions 18 are formed on both ends of the top foil 10. Accordingly, as described above, in the top foil 10, the force (local preload) clamping the rotary shaft 1 does not also occur at both ends thereof. Therefore, an increase in the starting torque due to the preload can be prevented, or heat generation during the operation can be prevented from increasing to be equal to or more than a set value.

Moreover, the thin portions 18 are formed on both ends of the top foil 10. Accordingly, for example, a heat treatment process to make both ends of the top foil fit in the curved surfaces (inner circumferential surfaces) of the bearing housing as in the related art is unnecessary.

Moreover, the thin portions 18 are formed on both ends of the top foil 10. Accordingly, the end (corresponding to the free end of the related art) of the top foil 10 at the side into which the ambient fluid flows is flexible. Therefore, as described above, the ambient fluid easily flows into a space between the top foil 10 and the rotary shaft 1. As a result, the fluid lubricating film becomes formed at a lower rotation rate, and startability of the rotary shaft 1 is improved.

Second Embodiment

Figure 3A:
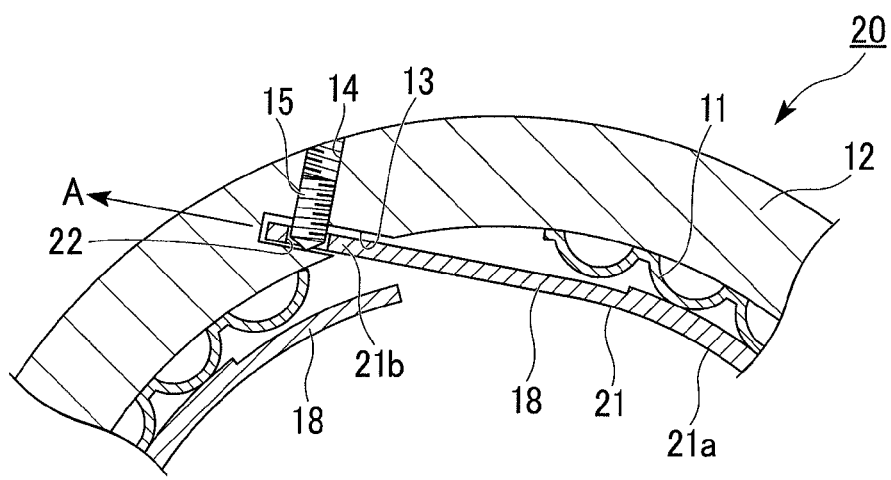
FIG. 3A is a view showing a schematic configuration of a second embodiment of a radial foil bearing according to the present invention, and is an enlarged side cross-sectional view of a main section of the radial foil bearing.
Figure 3B:
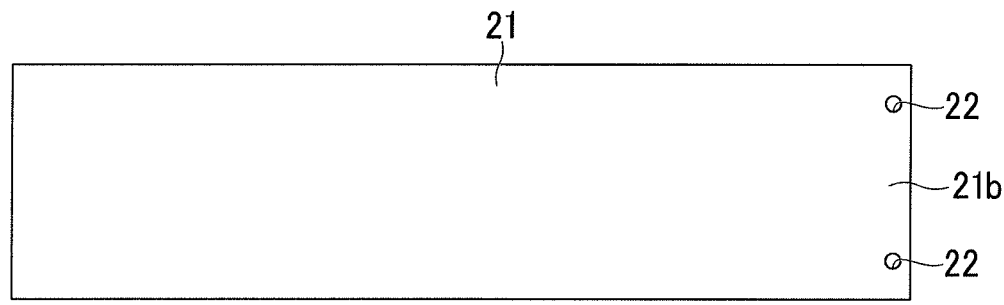
FIG. 3B is a view showing a schematic configuration of the second embodiment of the radial foil bearing according to the present invention, and is a developed view of a top foil.
Figure 3C:
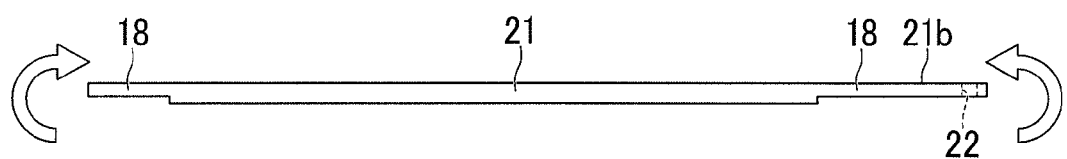
FIG. 3C is a view showing a schematic configuration of the second embodiment of the radial foil bearing according to the present invention, and is a developed side view of the top foil.

Next, a second embodiment of the radial foil bearing of the present invention will be described. FIGS. 3A to 3C are views showing the second embodiment of the radial foil bearing which is applied to the turbo machine shown in FIG. 1. FIG. 3A shows a radial foil bearing 20. A difference between the radial foil bearing 20 and the radial foil bearing 3 shown in FIGS. 2A and 2C is a method of fixing one end of a top foil 21 to the engagement groove 13.

That is, in the top foil 21 of the radial foil bearing 20 of the present embodiment, as shown in FIGS. 3A to 3C, through-holes 22, through which the tips of the male screws 15 pass, are formed in one end 21b. Two through-holes 22 are formed so as to correspond to the positions of the holes 14 shown in FIG. 2B. Moreover, the diameter of each of the through-holes 22 is formed to be larger than the outer diameter of the male screw 15. Accordingly, the male screws 15 contact the inner wall surface of the engagement groove 13 without pressing the one end 21b of the top foil 21. Therefore, deformation in the one end 21b of the top foil 21 due to pressing of the male screws 15 does not occur. In the state where the one end 21b extends out in a tangential direction of a cylinder portion 21a, the tip of the one end is securely held and fixed into the engagement groove 13.

In the radial foil bearing 20 of the present embodiment, effects similar to the radial foil bearing 3 shown in FIGS. 2A to 2E can be obtained. In addition, the one end 21b of the top foil 21 can be securely fixed into the engagement groove 13. Moreover, slight distortion in the top foil due to the deformation also can be prevented.

Third Embodiment

Figure 4A:
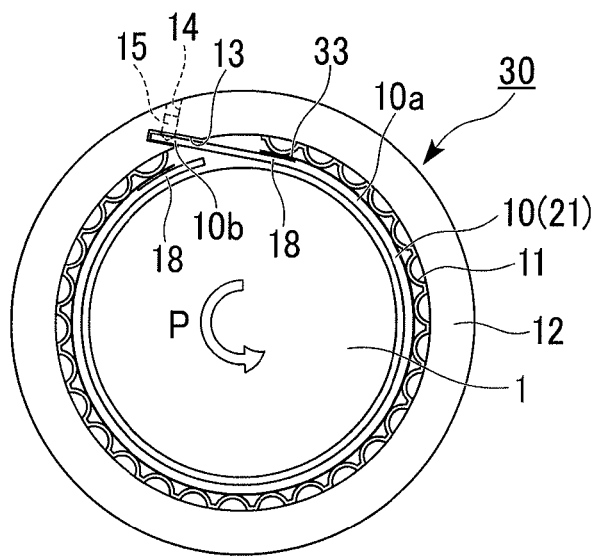
FIG. 4A is a view showing a schematic configuration of a third embodiment of a radial foil bearing according to the present invention, and is a side view of the radial foil bearing.
Figure 4B:
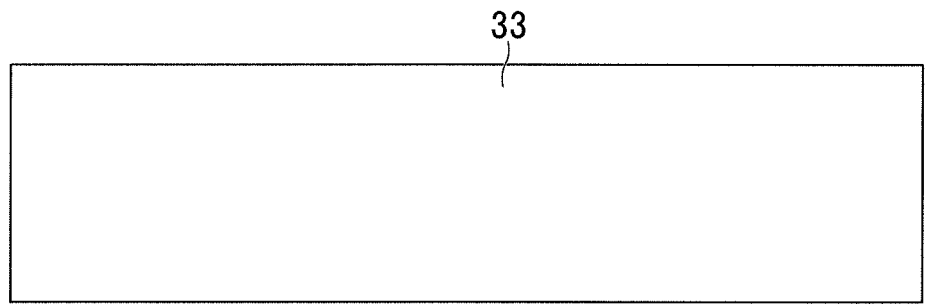
FIG. 4B is a view showing a schematic configuration of the third embodiment of the radial foil bearing according to the present invention, and is a developed view of an intermediate foil.
Figure 4C:
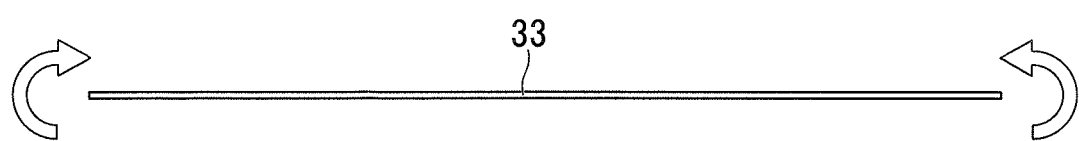
FIG. 4C is a view showing a schematic configuration of the third embodiment of the radial foil bearing according to the present invention, and is a developed side view of the intermediate foil.

A third embodiment of the radial foil bearing of the present invention will be described. FIGS. 4A to 4C are views showing the third embodiment of the radial foil bearing which is applied to the turbo machine shown in FIG. 1. FIG. 4A shows a radial foil bearing 30. A difference between the radial foil bearing 30 shown in FIG. 4A, and the radial foil bearing 3 and the radial foil bearings 20 shown in FIGS. 2A to 3C is that an intermediate foil 33 is provided between the top foil 10 (21) and the back foil 11.

As shown in FIG. 4A, the intermediate foil 33 is disposed between the top foil 10 (21) and the back foil (bump foil) 11. Moreover, similar to the top foil 10 (21), the intermediate foil 33 is rolled in a cylindrical shape along the inner surface of the back foil (bump foil) 11.

The intermediate foil 33 is held between the top foil 10 (21) and the back foil 11. Accordingly, even when deviation in the axial direction occurs between the intermediate foil 33 and the bearing housing 3 (20), it is possible to prevent the intermediate foil 33 from protruding outside the bearing housing 3 (20).

As shown in FIGS. 4B and 4C, in the present embodiment, the developed shape of the intermediate foil 33 is the same as the developed shape of the top foil 10 (21). However, the thickness of the intermediate foil 33 is formed to be thinner than that of the top foil 10 (21).

In the first and second embodiments, the thin portions 18 are formed on both ends of the top foil 10 (21). The thin portions 18 may be also formed in the intermediate foil 33. The thin portions 18 may be formed only in the intermediate foil 33 without being formed in the top foil 10 (21). For example, since the thickness of the intermediate foil 33 is formed to be significantly thin of, for example, approximately 30 μm, in most cases, a thin portion is not formed in the intermediate foil. Accordingly, in the present embodiment, the thin portion 18 is formed only in the top foil 10 (21).

According to the radial foil bearing 30 of the present embodiment, effects similar to the radial foil bearings 3 (20) shown in FIGS. 2A to 3C can be obtained. In addition, since the radial foil bearing 30 includes the intermediate foil 33 between the top foil 10 (21) and the back foil 11, if shaft vibration is generated at the time of the rotation of the rotary shaft 1, a variation in film pressure according to the shaft vibration is transmitted from the top foil 10 (21) to the back foil 11 via the intermediate foil 33. At this time, minute bending (varying depending on load) due to a load variation is generated in the top foil 10 (21). Accordingly, "sliding" occurs between the top foil 10 (21) and the intermediate foil 33 and between the intermediate foil 33 and the back foil 11. Such "sliding" causes energy dissipation due to friction, and the variation in film pressure is dampened. That is, damping effects with respect to the variation in film pressure can be obtained. Therefore, the shaft vibration is suppressed through the damping effects, and the shaft vibration can be easily suppressed. Moreover, rigidity of the top foil 10 (21) can be reinforced by the intermediate foil 33. As a result, dynamic characteristics (rigidity and damping) of the radial foil bearing 3 (20) can be sufficiently increased.

Moreover, the present invention is not limited to the above-described embodiments, and various modifications can be realized within a scope which does not depart from the gist of the present invention.

For example, the male screw 15 is used as the fixing device in the above embodiments. However, instead of this, a wedge-shaped pin or the like is used, the pin is inserted into the hole 14, and thus, the one end of the top foil 21 may be fixed to the engagement groove 13.

With respect to the thin portion 18, for example, etching processing is performed on both surfaces (front surface and rear surface) thereof, and thus, the thin portion may be formed.

In the above-described embodiments, the entirety of the one end 10b (21b) of the top foil 10 (21) is extended from the cylinder portion 10a (21a), and the tip thereof is engaged with the engagement groove 13. However, for example, an extension piece is provided so as to extend from an edge of the one end 10b (21b), and only the extension piece may be engaged with the engagement groove 13. Moreover, only the extension piece is formed so as to extend from the cylinder portion 10a (21a), and the extension piece may be used as the one end of the present invention.

Figure 5:
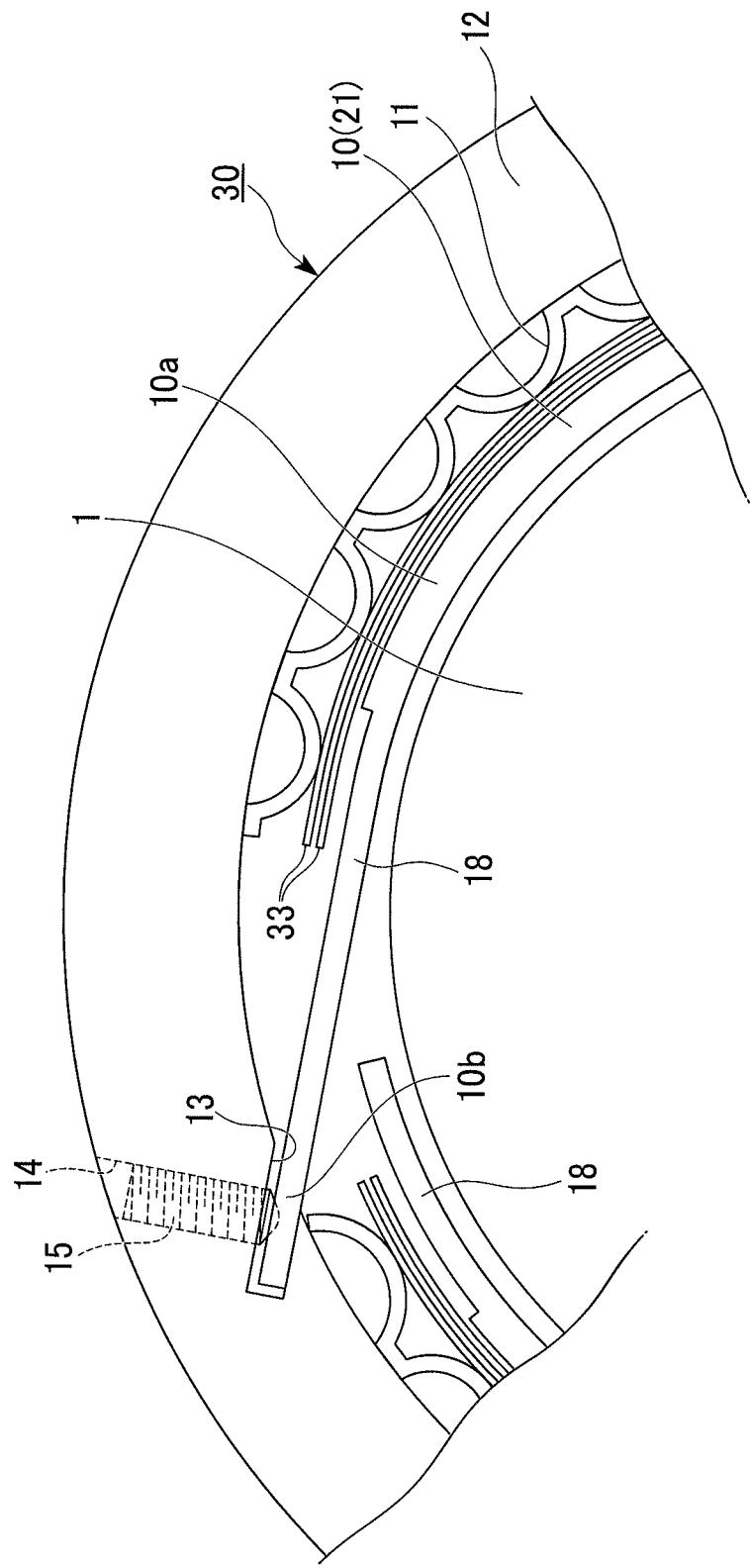
FIG. 5 is a view corresponding to an enlarged view of FIG. 4A and is a view showing a modification of the third embodiment.

In the above-described embodiment, one intermediate foil 33 is used. However, intermediate foils may be stacked together, and thus the intermediate foil may be a multilayer. FIG. 5 is a view corresponding to an enlarged view of FIG. 4A and is a view showing a modification of the third embodiment. As shown in FIG. 5, the intermediate foils are disposed to be stacked together between the back foil and the top foil, and thus, damping effects which are obtained by friction due to sliding between intermediate foils can be added to the damping effects which are obtained by the friction generated due to the mutual sliding between the top foil and the intermediate foil and between the intermediate foil and the back foil. As a result, the shaft vibration of the rotary shaft is suppressed, and thus, the shaft vibration can be more easily suppressed.

In order to increase damping capacity of the radial foil bearing, as described above, the multilayer, which is obtained by stacking intermediate foils, is effective. However, in the related art, the intermediate foil is fixed to the bearing housing using spot welding. Therefore, the thickness of the intermediate foil has to be adjusted to an extent such that melting-down is not generated by the spot welding, and thus, the thickness of the intermediate foil is approximately the same as the thickness of the top foil. If the intermediate foils having the thicknesses like this are stacked together and become the multilayer, the rigidity (the rigidity in which those of the top foil and the intermediate foil are added) of the bearing surface is significantly increased, and thus, the bearing surface cannot follow the variation in film pressure of the fluid lubricating film which is generated due to the shaft vibration. As a result, the above-described sufficient damping effects by the "sliding" between foils cannot be obtained.

However, in the above-described embodiments, the intermediate foil 33 is held between the top foil 10 (21) and the back foil 11 without using the spot welding. Accordingly, the intermediate foil can be formed to be thinner than the top foil. Therefore, the intermediate foils can be stacked together while a magnitude (strength) of the rigidity of the bearing surface is appropriately adjusted.

INDUSTRIAL APPLICABILITY

According to a radial foil bearing of the present invention, a radial foil bearing can be obtained which prevents occurrence of distortion of a top foil and has the designed favorable performance with respect to a loading capability or dynamic characteristics (rigidity and damping) of a bearing.

REFERENCE SIGNS LIST

1 rotary shaft
3 radial foil bearing
10 top foil
10a cylinder portion (cylinder)
10b one end
11 back foil (bump foil)
12 bearing housing
13 engagement groove
14 hole
15 male screw (fixing device)
18 thin portion
20 radial foil bearing
21 top foil
21a cylinder portion (cylinder)
21b one end
22 through-hole
30 radial foil bearing
33 intermediate foil

The invention claimed is:

1. A radial foil bearing for supporting a rotary shaft by being externally attached to the rotary shaft, the radial foil bearing comprising:
   a cylindrical top foil disposed so as to face the rotary shaft;
   a back foil disposed on a radially outer side of the top foil; and
   a cylindrical bearing housing accommodating the top foil and the back foil in an inside of the bearing housing,
   wherein the top foil is formed by winding a rectangular metal foil into a cylindrical shape so that one end of the metal foil is extended out in a tangential direction of a cylinder formed by the metal foil,
   wherein an engagement groove is formed on an inner circumferential surface of the bearing housing in an axial direction of the bearing housing,
   wherein the engagement groove is formed so that a depth direction thereof corresponds to the tangential direction of the cylinder of the top foil,
   wherein the one end extending out in the tangential direction of the cylinder of the top foil engages with the engagement groove, and
   wherein a thin portion is formed in each of the one end and the other end opposite to the one end in the top foil, the thin portion being thinner than an intermediate portion between the one end and the other end.

2. The radial foil bearing according to claim 1, wherein the thin portion is formed in a state where an outer circumferential surface of the thin portion is depressed further than an outer circumferential surface of the intermediate portion.

3. The radial foil bearing according to claim 2, wherein the one end of the top foil engaging with the engagement groove is fixed into the engagement groove by a fixing device.

4. The radial foil bearing according to claim 3, wherein an intermediate foil is disposed between a radially outer side of the top foil and a radially inner side of the back foil, and the bearing housing accommodates the top foil, the intermediate foil, and the back foil in the inside of the bearing housing.

5. The radial foil bearing according to claim 3, wherein intermediate foils are disposed between a radially outer side of the top foil and a radially inner side of the back foil, and the bearing housing accommodates the top foil, the intermediate foils, and the back foil in the inside of the bearing housing, and
   wherein the intermediate foils are stacked together.

6. The radial foil bearing according to claim 2, wherein an intermediate foil is disposed between a radially outer side of the top foil and a radially inner side of the back foil, and the bearing housing accommodates the top foil, the intermediate foil, and the back foil in the inside of the bearing housing.

7. The radial foil bearing according to claim 2, wherein intermediate foils are disposed between a radially outer side of the top foil and a radially inner side of the back foil, and the bearing housing accommodates the top foil, the intermediate foils, and the back foil in the inside of the bearing housing, and
   wherein the intermediate foils are stacked together.

8. The radial foil bearing according to claim 1, wherein the one end of the top foil engaging with the engagement groove is fixed into the engagement groove by a fixing device.

9. The radial foil bearing according to claim 8, wherein an intermediate foil is disposed between a radially outer side of the top foil and a radially inner side of the back foil, and the bearing housing accommodates the top foil, the intermediate foil, and the back foil in the inside of the bearing housing.

10. The radial foil bearing according to claim 8, wherein intermediate foils are disposed between a radially outer side of the top foil and a radially inner side of the back foil, and the bearing housing accommodates the top foil, the intermediate foils, and the back foil in the inside of the bearing housing, and
    wherein the intermediate foils are stacked together.

11. The radial foil bearing according to claim 1, wherein an intermediate foil is disposed between a radially outer side of the top foil and a radially inner side of the back foil, and the bearing housing accommodates the top foil, the intermediate foil, and the back foil in the inside of the bearing housing.

12. The radial foil bearing according to claim 1, wherein intermediate foils are disposed between a radially outer side of the top foil and a radially inner side of the back foil, and the bearing housing accommodates the top foil, the intermediate foils, and the back foil in the inside of the bearing housing, and
    wherein the intermediate foils are stacked together.

* * * * *